Jan. 26, 1965  R. W. LILLIE  3,167,603
PROCESS AND APPARATUS FOR PRODUCING LAMINATED PANELS
Filed March 31, 1961  2 Sheets-Sheet 1
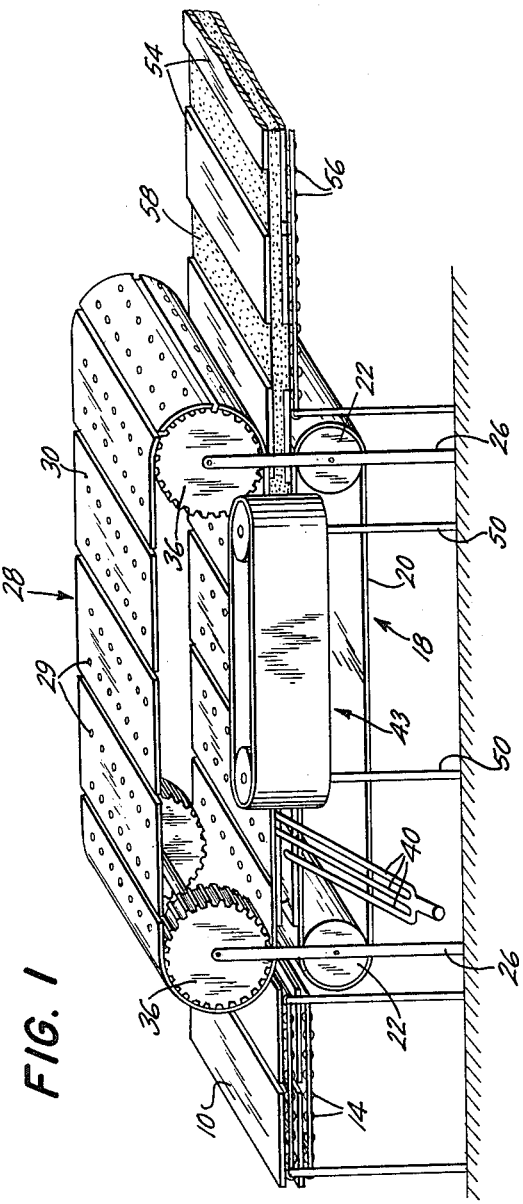
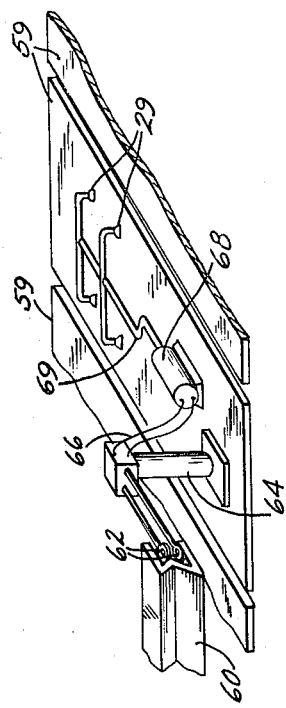
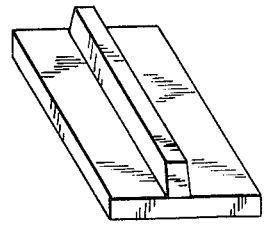
INVENTOR
ROBERT W. LILLIE
BY
ATTORNEY

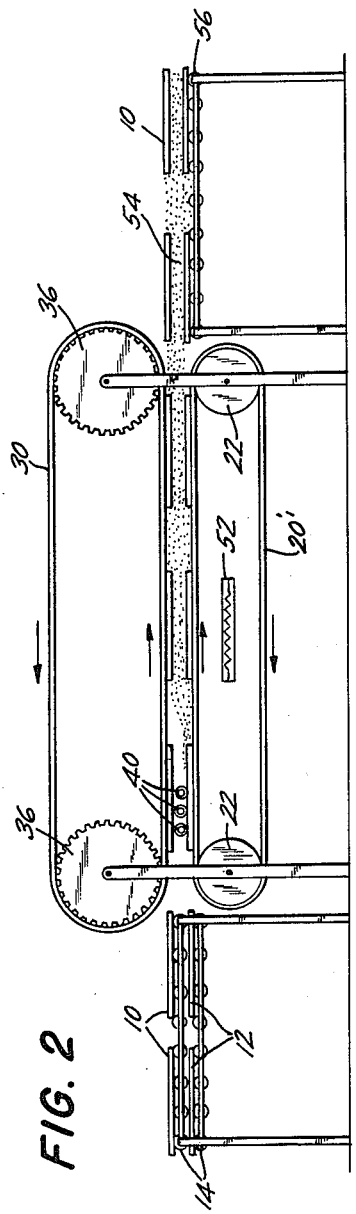
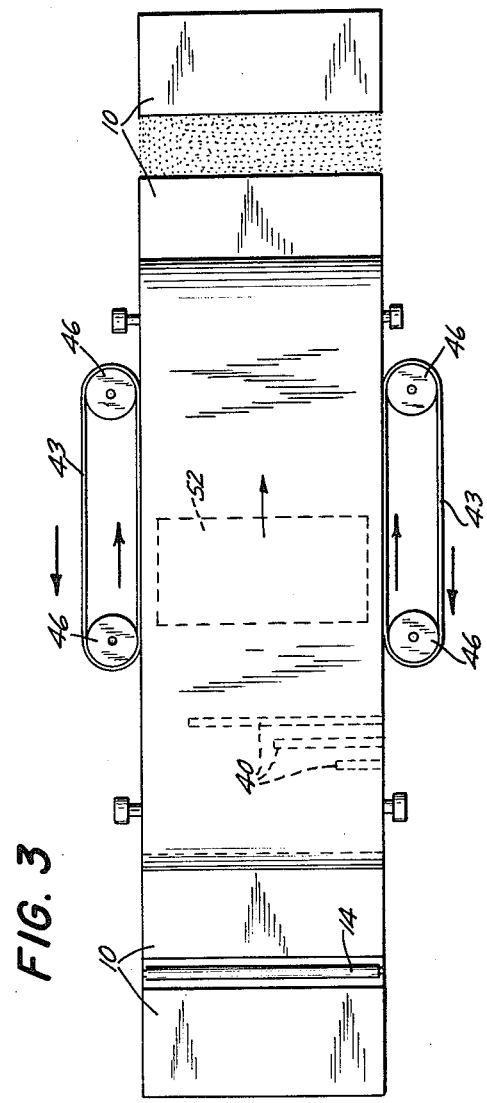

United States Patent Office 3,167,603
Patented Jan. 26, 1965

3,167,603
PROCESS AND APPARATUS FOR PRODUCING
LAMINATED PANELS
Robert W. Lillie, Rumson, N.J., assignor to Union
Carbide Corporation, a corporation of New York
Filed Mar. 31, 1961, Ser. No. 99,854
4 Claims. (Cl. 264—47)

The present invention relates to a process and apparatus for producing laminated panels and, more particularly, to a process and apparatus for continuously producing structural panels having foamed cores.

Heretofore, the high strength, good insulating properties, and low weight of foamed plastic materials have enabled such materials to replace other forms of packing and insulation as the cores of structural panels. These foam-cored panels have usually been produced by foaming the plastic material between outer skins held in individual molds, e.g., by pouring foaming resin into the cavity between two skins held apart in a mold. However, such processes are batch processes and require a multiplicity of molds to obtain high production rates. Furthermore, dimensional control of the laminated panels can be achieved only by changing the size of the mold.

It is, therefore, the main object of the present invention to provide a process and apparatus for continuously producing foam-cored panels.

It is another object of the invention to provide such a process and apparatus whereby a uniform thickness of the foamed core is achieved.

It is a further object of the invention to provide a process and apparatus for continuously producing foam-cored laminates either as continuous sections or as individual panels.

It is a still further object of the invention to provide such a process and apparatus whereby panels of varying dimensions can be continuously produced.

Other aims and advantages of the present invention will become apparent from the following description and appended claims.

As used herein, the following terms have the following meanings:

The term "foamable plastic material" refers to any plastic material capable of being foamed, whether by an external or internal foaming agent, by increased temperature, by decreased external pressure, by increased internal pressure resulting from the vaporization of the foaming agent, or by any combination of the foregoing.

The term "foaming agent" refers to so-called blowing agents generally, whether in liquid, solid, or gaseous form, which act by chemical or catalytic reaction or mechanically to cause a foamable plastic material to expand and become filled with fine gas bubbles, as a foam. Some typical examples of foaming agents are nitrogen, carbon dioxide, azo dicarbonamide and certain fluorcarbon propellants.

In accordance with the present invention, there is provided a process for producing foam-cored laminates comprising continuously advancing a lower layer of sheet material and an upper layer of sheet material spaced a predetermined distance above and substantially parallel to the lower layer; continuously depositing a uniform layer of foamable plastic material onto the lower layer while advancing the layers; forming an endless moving cavity between the upper and lower layers; increasing the temperature of the foamable material to a degree sufficient to cause the foamable plastic material to expand to the definitional limits of the endless moving cavity and to adhere to the upper and lower layers, thereby forming a foam-cored laminate; and curing the foamed material.

The layers of sheet material can be continuous so as to produce a continuous laminated article which can be severed into any desired lengths, or the layers can be supplied as separate panels. If separate panels of sheet material are employed, the upper and lower boundaries of the endless moving cavity wherein the foaming is effected are alternately defined by the panels of sheet material and the horizontal mold-conveyor means, so that the resulting laminated panels are connected by sections of foam. As hereinafter described, the lengths of the panels can be varied without interrupting the continuous production. Alternatively, panels of rigid material, such as plywood or hardwood veneer, may be joined and supplied as a continuous sheet material.

The core material may be any convenient foamable plastic material, such as phenol formaldehyde-protein resins, phenol formaldehyde-polyvinyl formal resins, phenol formaldehyde-polyvinyl alcohol resins, phenol formaldehyde-glycerine resins, phenol formaldehyde-urea resins, phenol formaldehyde-melamine resins, phenol formaldehyde-diazine resins, phenol furfural resins, phenol furfural formaldehyde resins, trazine formaldehyde resins, benzene disulphonamide-acrolein resins, melamine dicyandiamide resins, polyethylenemaleate-ethyl methacrylate resins, polypropyl maleate-vinyl acetate resins, methyl methacrylate-glycol methacrylate resins, polyvinyl chloride-diallyl succinate resins, styrene-divinyl benzene resins, polyurethanes, epoxides, etc. The percentage of resin present in the core of the laminate will vary with the size of the product and the intended use.

In the drawings:

FIG. 1 is an isometric view of the preferred apparatus embodying the present invention;

FIG. 2 is a side elevational view of the apparatus of FIG. 1 without the vertical conveyor belts;

FIG. 3 is a top view of the apparatus of FIG. 1;

FIG. 4 is a detail view of a section of a modified side conveyor belt; and

FIGURE 5 is a perspective view of the preferred apparatus for applying suction to the ports in the upper conveyor belt.

The inventive process and apparatus will now be explained in greater detail by referring to the drawings.

Referring to FIGS. 1 to 3, the inventive apparatus may generally comprise a supporting means 26; a lower horizontal mold-conveyor means 18 supported by the supporting means 26; an upper horizontal mold-conveyor means 28 supported by the supporting means 26 and spaced a predetermined distance above and substantially parallel to the lower mold-conveyor means 18; suction means for causing sheet material to adhere to the upper mold-conveyor means 28; feed means 40 for depositing a uniform layer of foamable plastic material onto the lower mold-conveyor means 18; and vertical side mold-conveyor means 43 arranged so that the vertical surfaces of the side-mold-conveyor means contact the edges of the horizontal mold-conveyor means 18 and 28 so as to form an endless moving cavity.

Two layers of sheet material, an upper layer 10 and a lower layer 12, are fed into the space between the horizontal mold-conveyor means 18 and 28 by means of rollers 14, which can be driven by any convenient driving means. Although the sheet material is shown in the form of panels, this material may be in the form of continuous sheets, or panels joined together to make continuous sheets. Similarly, the sheet material need not be rectangular in shape, but may be circular or any other convenient shape. The sheet material may be aluminum, plywood, wood veneer, resin impregnated material, or any other suitable facing material.

As the sheet material is fed between the horizontal mold-conveyors, the lower panels 12 are supported by and conveyed by the lower mold-conveyor means 18. In the apparatus shown in the drawings, the lower mold-conveyor means 18 comprises a conveyor belt 20 driven by rolls 22, which are rotatively mounted on the supporting means 26 and driven by any convenient driving means (not shown). The upper panels 10 of sheet material are picked up by and conveyed by the upper mold-conveyor means 28. Suction applied to ports 29 in the upper conveyor belt 30 by means of motor-driven vacuum pumps causes the upper panels 10 to adhere to the underside of the conveyor belt 30. A detail view of preferred apparatus for applying suction to the ports 29 in the upper conveyor belt is shown in FIG. 5. A bus duct 60 for supplying electric power is mounted along the side of the upper mold-conveyor means 28 and is contacted by a pair of power pickup wheels or compression shoes 62 protruding from each section 59 of the belt 30. The pickup wheels 62 are mounted on a supporting means 64 affixed to each section 59. Electric current from the bus duct 60 passes through the pickup wheels 62 and on through conductors 66 into a motor-driven vacuum pump 68, which draws a suction on the ports 29 (only a few of which are shown) through tubing 68. Each belt section 59 is provided with its own pickup wheels and motor-driven vacuum pump. Since the vacuum need be on only during a portion of the travel of the mold conveyor, the bus duct need be only as long as this portion. Thus, the pickup wheels of a particular section engage the power rail as that section moves into a horizontal position and then disengage after the foam has expanded sufficiently to hold the upper panels in position. Of course, the ports 29 and the upper panels 10 must be arranged so that all the ports are covered by the panels when the hereinafter-described foaming step is carried out.

Referring back to FIGS. 1 to 3, the upper mold-conveyor belt 30 is driven by sprocket wheels 36, which are supported a predetermined distance above the lower rolls 22 by the supporting means 26 and are driven in a direction opposite to that of the lower rolls 22 by any convenient driving means. The radius of the sprocket wheels 36 must be large enough to allow the vacuum apparatus mounted on the inner surfaces of the belt sections to freely pass the axle for the sprocket wheels 36. The upper conveyor belt should be driven at the same speed as that of the lower conveyor belt so that the upper and lower panels progress through the machine together.

As the panels are advanced by the conveyor belts, the lower panels 12 are passed under a plurality of feed tubes 40 inserted between the conveyor belts. The feed tubes 40 continuously deposit a uniform layer of foamable plastic material onto the lower panels 12 of sheet material, and also onto the lower conveyor belt 20 in the spaces between the panels. Of course, if a continuous layer of sheet material were employed, the entire layer of foamable material would be deposited onto the sheet material. The foaming agent in the foamable plastic material may be external or internal. As shown in FIG. 3, the feed tubes 40 are terminated at varying distances from the edge of the conveyor belt in order to insure a uniform distribution of the foamable material across the surfaces of the lower panels. Alternatively, the feed tubes could all be made the same length and then continuously moved back and forth across the panels. Since the core material must at least fill the space between the conveyor belts when foamed, the flow rate of the foamable material from the feed tubes 40 is dependent upon the speed of the passing panels and the distance between the upper and lower conveyor belts.

As the upper and lower conveyor belts and the panels and foamable material thereon are advanced, the edges of the horizontal conveyor belts are contacted with the surfaces of vertical side mold-conveyor means 43 so as to form an endless moving cavity. The vertical side mold-conveyor means prevent the foam from surging out the sides of the cavity. The side conveyor belts are driven by rolls 46, which are supported by supporting means 50 and driven by any convenient driving means. As indicated by the arrows in FIG. 3, the side conveyor belts are driven in opposite directions such that the surfaces which contact the edges of the horizontal conveyor belts move in the same direction as the contacted edges.

After the panels and foamable material have been enclosed by the side conveyors, the temperature of the layer of foamable material is increased to a degree sufficient to cause the material to expand to the limits of the endless moving cavity as defined by the upper and lower panels and the four mold-conveyor means. In the preferred apparatus shown in the drawings, the temperature required for foaming is achieved by means of a heating means 52 (see FIG. 2) placed within the lower mold-conveyor means 18. The foamed material and the sheet material must be such that the foamed material adheres to the sheet material so as to form a foamed-core laminate. Thus, if the foamed material does not naturally adhere to the sheet material employed, the sheet material must be previously provided with an adhesive layer on the surfaces to be contacted with the foam.

After the foaming has been completed, the endless moving cavity is continued for a distance sufficient to cure the foamed core, and the laminates 54 are removed from the inventive apparatus by rollers 56. When panels of sheet material are employed rather than continuous sheets, the resulting laminated panels will be joined by foamed sections 58.

Of course, modified apparatus and/or processes can be devised within the scope of the invention described herein. For example, if it were desired to provide the edges of the foamed-core laminates with a recess to take a spline, the vertical side conveyors could be given the form shown in FIG. 4. Similarly, the panel edges could be given other forms simply by modifying the surfaces of the side conveyor belts. Also, the upper belt conveyor could be shortened so that the upper layers of sheet material are not picked up by the conveyor until the foaming commences.

What is claimed is:

1. The process for producing foam-cored laminates comprising: continuously advancing a lower series of panels of sheet material on a lower conveyor belt and continuously advancing at the same rate thereof an upper series of panels of sheet material by means of an upper conveyor belt, releasably holding said upper series of panels to said upper conveyor belt a spaced predetermined distance apart from and substantially parallel to said lower series of panels, said holding being achieved by applying a vacuum through said upper conveyor belt through to the top surfaces of said upper series of panels, continuously depositing a uniform layer of foamable plastic material onto said lower series of panels while advancing said upper and lower series of panels, and heating said foamable material so that said material expands and cures within the definitional limits of the cavity formed by said panels and adheres thereto, said vacuum being generated by a motor-driven vacuum pump secured to said upper conveyor belt upon the passing of current pickup wheels communicating therewith along a bus bar carrying electrical energy during the expansion and curing of said foamable material.

2. The process for producing foam-cored laminates comprising: continuously passing an upper series and a lower series of panels of sheet material between upper and lower mold-conveyor means; said upper mold-conveyor means comprising a plurality of perforated sectional elements joined together to form said upper conveyor means, vacuum means releasably holding said upper panels to said upper conveyor means a spaced predetermined distance apart from and substantially parallel to said lower conveyor means, said vacuum being generated by individual motor driven vacuum pumps secured to each of said perforated sectional elements and which communicates with each of said perforations therein, passing electrical energy to said pumps by means of current pickup wheels secured to each of said sectional elements and engaging a common bus bar carrying electrical energy, continuously depositing a uniform layer of foamable plastic material onto said lower panels and onto said lower mold-conveyor means between said lower panels while advancing said upper and lower panels at the same rate thereof, and heating said foamable plastic material so that said material expands and cures between the boundaries formed by said upper and lower mold-conveyor means and adheres to said upper and lower series of panels of sheet material whereby discontinuous foam-cored laminates are continuously produced.

3. Apparatus for producing foam-cored laminates comprising: supporting means; lower horizontal mold-conveyor means supported by said supporting means; upper horizontal mold-conveyor means supported by said supporting means and spaced a predetermined distance above and substantially parallel to said lower mold-conveyor means; vacuum means for causing sheet material to be releasably secured to said upper mold-conveyor means; feed means for depositing a uniform layer of foamable plastic material onto said sheet material disposed upon said lower mold-conveyor means; vertical side mold-conveyor means arranged so that the vertical surfaces of said side mold-conveyor means contact the edges of said horizontal mold-conveyor means in order to form an endless moving cavity; said upper horizontal mold-conveyor means having a plurality of perforated sectional elements joined together to form an endless belt, said vacuum means secured to the inner side of each of said perforated sectional elements and comprising a motor-driven vacuum pump, a plurality of tubes connected to said vacuum pump and communicating with said perforations, and pickup wheels for conducting electrical energy to said vacuum pump, said pickup wheels engaging a bus bar carrying electrical energy during the expansion and curing of said foamable material so as to provide a vacuum in said tubes to hold said sheet material in position against said upper mold-conveyor means.

4. Apparatus for producing foam-cored laminates comprising: supporting means; a lower horizontal belt conveyor supported by said supporting means, an upper horizontal belt conveyor supported by said supporting means and spaced a predetermined distance above and substantially parallel to said lower belt conveyor; said upper belt conveyor comprising a plurality of perforated sectional elements joined together to form an endless belt, driving means for rotating said upper and lower conveyor belts in the same direction, vacuum means releasably securing an upper series of panels of sheet material to said upper belt conveyor, feed means for depositing a uniform layer of foamable plastic material onto said lower belt conveyor, said feed means comprising a plurality of tubes having feed openings at varying distances from the edges of said lower belt conveyor, said vacuum being generated by individual motor driven vacuum pumps secured to each of said perforated sectional elements and which communicate with each of said perforations therein; each of said motor driven vacuum pumps being supplied with electrical energy by means of current pickup wheels secured to each of said sectional elements and engaging with a common bus bar carrying electrical energy; vertical side belt conveyors arranged so that the vertical surfaces of the side conveyor belts contact the edges of said horizontal belt conveyors in order to form an endless moving cavity, driving means for rotating said side belt conveyors in the same direction; and heating means for causing said foamable plastic material to expand and cure within the definitional limits of said cavity and to adhere to said upper and lower series of panels of sheet material.

References Cited in the file of this patent
UNITED STATES PATENTS

| | | |
|---|---|---|
| 2,111,761 | Sckert | Mar. 22, 1938 |
| 2,130,241 | MacLaurin | Sept. 13, 1938 |
| 2,549,864 | Toulmin | Apr. 24, 1951 |
| 2,698,260 | Meauze et al. | Dec. 28, 1954 |
| 2,762,739 | Weiss | Sept. 11, 1956 |
| 2,841,205 | Bird | July 1, 1958 |
| 2,866,730 | Potchen et al. | Dec. 30, 1958 |
| 2,948,381 | Penn | Aug. 9, 1960 |
| 2,962,407 | Aykanian | Nov. 29, 1960 |